No. 886,316. PATENTED APR. 28, 1908.
J. S. DUNN.
VALVE FOR TIRES.
APPLICATION FILED SEPT. 13, 1906.
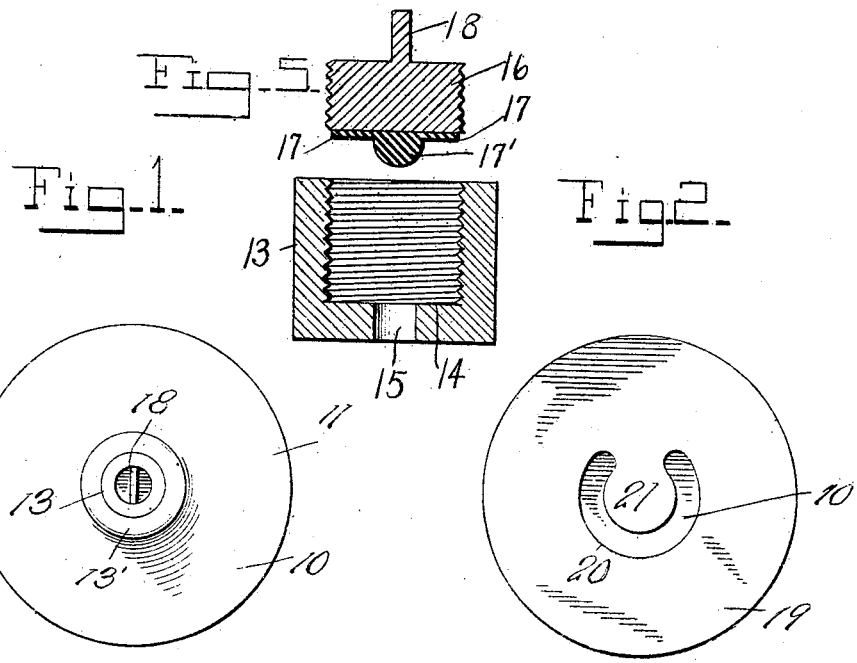
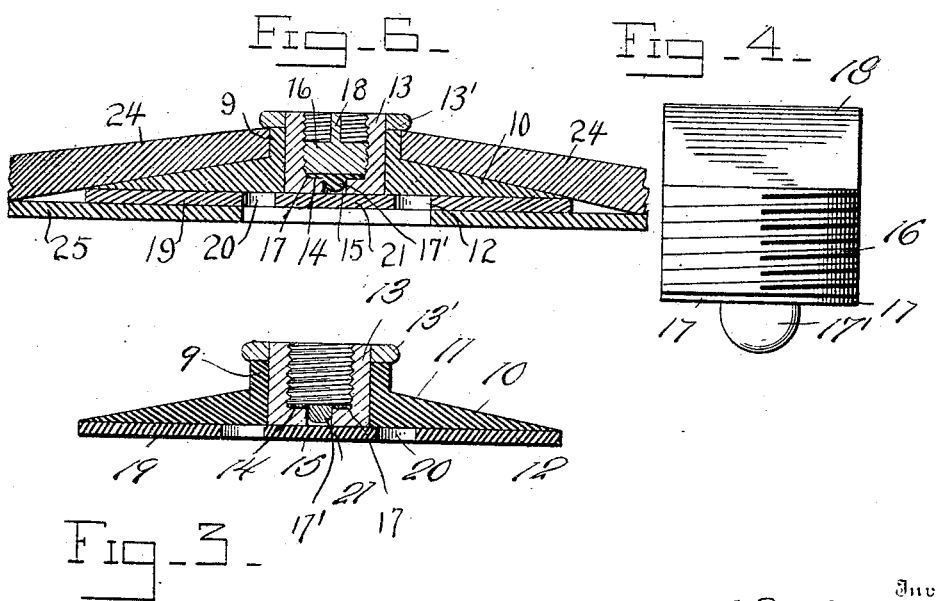
Witnesses
G. R. Thomas
R. C. Barrett
Inventor
J. S. Dunn
By Chandler & Chandler
Attorneys

UNITED STATES PATENT OFFICE.

JOHN SAMUEL DUNN, OF VINCENNES, INDIANA, ASSIGNOR OF ONE-THIRD TO SAMUEL T. LANGDON, JR., OF VINCENNES, INDIANA, AND ONE-THIRD TO LEONARD C. LANGDON, OF OAK PARK, ILLINOIS.

VALVE FOR TIRES.

No. 886,316.        Specification of Letters Patent.        Patented April 28, 1908.

Application filed September 13, 1906. Serial No. 334,475.

*To all whom it may concern:*

Be it known that I, JOHN SAMUEL DUNN, a citizen of the United States, residing at Vincennes, in the county of Knox, State of Indiana, have invented certain new and useful Improvements in Valves for Tires; and I do hereby declare the following to be a full, clear, and exact description of the invention, such as will enable others skilled in the art to which it appertains to make and use the same.

This invention has relation to valves for pneumatic tires and means for securing the same to the tires.

It is the object of the invention to produce a thoroughly efficient valve for use on all classes or kinds of pneumatic tires, whether used on bicycles, automobiles, or vehicles or machines of other kinds, the construction of which will be simple and its manufacture of little cost.

It is further proposed to produce a valve of the kind mentioned that will not tear out should the tire creep on the rim, and a valve also that may be readily used and be possessed of other advantages, as will hereinafter appear.

The nature of the invention is clearly portrayed in the annexed drawings, forming a part of this specification, in view of which the improvements will first be described in detail with respect to its construction and mode of operation, and then be pointed out in the subjoined claims.

Of the said drawings—Figure 1 is a plan. Fig. 2 is a bottom view of the valve proper. Fig. 3 is vertical central sectional view. Fig. 4 is a side view of the plug. Fig. 5 is a sectional view of the plug and bushing drawn to an enlarged scale. Fig. 6 is a sectional view, indicating a position the invention may take in the outer casing of a pneumatic tire.

Similar numerals of reference designate the same parts or features, as the case may be, wherever they occur.

In the drawings 10 designates a disk of rubber, vulcanized to a desired degree, the upper surface 11 of which is of substantially convex or inclined form, sloping from its center to its edges, and the lower face 12 of which is substantially flat. A hole is formed through the center of the disk 10 and a neck 9 for the reception of a metallic bushing 13 secured in the hole in any suitable way, the bushing extending at its outer end a little beyond the outer face of neck 9, and surrounding this outer extension is a metal band 13' shrunk or otherwise secured on the bushing. The interior of the bushing is screw-threaded in such form and manner as to have pump-tubes of standard or universal form and construction applied thereto.

The bushing is provided near its inner end with an offset 14, reducing the diameter of the opening 15 into the tire. A plug 16 is provided having the exterior of its body portion screw-threaded and fitted as to size, and the said plug is provided on its bottom with a ring of rubber 17 or other means of similar character to serve as a packing when the plug is screwed home on the offset 14. The plug 16 may furthermore be provided centrally on its under side with a projection, 17', adapted to enter the hole 15 in the bottom of the bushing when the plug is screwed into place in the bushing.

The bottom 12 of the disk 10 has a disk of rubber 19 secured thereto. The said rubber disk has a strip cut out, as at 20, for two-thirds or three-fourths of the way around its center 21 so that when the disk of rubber is secured to the bottom 12 of the disk 10, the central portion will a little more than cover the bottom of the bushing 13 and act as a clack-valve to the opening 15 into the tire.

The extension or teat 17' on the bottom of the plug 16 is not essential, though in some cases it is useful. It will not be made long enough to interfere with the functions of the valve 21 closing the hole or port 15.

The disk 11 may be secured in the outer casing 24 so that the upper or outer end of the bushing 13 therein will be flush or nearly flush with the outer face of the tire, while the inner face of the disk 11 and rubber disk 19 will be inside the outer casing and have its lower surface covered by the inside tube 25. Any other efficient way of securing the disk 11 to the outside casing and inner tube will answer as well.

From the fact that the valve and its means of attachment are entirely included within the tire, and so far as they extend form practically a part of the tire, they move with the latter so that should the tire creep on the rim of the wheel that action will not result in the tearing out of the tire.

The opening of the valve being on the periphery of the valve it is made easy to apply a pump for inflating the tire. Furthermore, the extension of the bushing to the face or nearly to the face of the tire does not affect the resiliency or riding qualities of the tire to any degree.

What is claimed is—

1. A valve for pneumatic tires consisting of a disk of hard rubber secured between the outer and inner tubes, provided centrally with an outwardly extended hollow neck, having an interiorly screw-threaded bushing secured in said hollow neck and extending to substantially the periphery of the tire and beyond the said hollow neck, a protecting ring surrounding the outer end of the bushing, a plug adapted to be screwed into and out of the said bushing and a flap valve to control the opening of the said bushing at its inner end.

2. A valve for pneumatic tires consisting of a disk having its upper side or face sloping outward to its edge and a flat lower face secured between the outer and inner tubes of the tire, said disk being provided centrally with an outwardly extended hollow neck, an interiorly screw-threaded bushing secured in said hollow neck and extending outwardly beyond the hollow neck, a protecting ring surrounding the outer end of the bushing projecting beyond the hollow neck and having an inturned offset near its inner end, a plug adapted to be screwed into and out of said bushing, a packing ring interposed between the inner end of the plug and the said offset, and a flap valve to control the opening of the bushing at its inner end.

In testimony whereof, I affix my signature, in presence of two witnesses.

JOHN SAMUEL DUNN.

Witnesses:
JOHN DOWNEY,
HARRY R. LEWIS.